United States Patent [19]
Gillemot

[11] 3,985,949
[45] Oct. 12, 1976

[54] CABLE WITH TURN BACK PROTECTOR

[75] Inventor: George W. Gillemot, Santa Monica, Calif.

[73] Assignee: John T. Thompson, Los Angeles, Calif. ; a part interest

[22] Filed: May 30, 1975

[21] Appl. No.: 582,252

Related U.S. Application Data

[63] Continuation of Ser. No. 411,648, Nov. 1, 1973, abandoned.

[52] U.S. Cl. .......................... 174/70 R; 138/110; 174/135; 301/63 DD; 301/63 PW
[51] Int. Cl.² ........................................ H02G 1/00
[58] Field of Search ................ 174/37, 40 R, 70 R, 174/92, 135; 24/115 R, 115 J, 115 K; 29/428; 74/230.05, 230.3, 230.11, 230.13; 138/110; 152/403, 404, 406; 248/75; 301/35 R, 63 DD, 63 DS, 63 PW, 63 DT, 64 SH; 403/209, 210, 213

[56] References Cited
UNITED STATES PATENTS

| | | | |
|---|---|---|---|
| 1,654,035 | 12/1927 | Campos et al. | 301/63 DS |
| 1,683,023 | 9/1928 | Champion | 174/135 X |
| 2,272,019 | 2/1942 | Reemes et al. | 301/63 DS |
| 2,473,363 | 6/1949 | Cook et al. | 24/115 K X |
| 2,530,812 | 11/1950 | Carmer, Jr. et al. | 174/135 |
| 2,858,590 | 11/1958 | Koch | 174/135 UX |
| 2,878,302 | 3/1959 | Perkins | 174/92 X |
| 3,806,630 | 4/1974 | Thompson et al. | 174/37 X |

FOREIGN PATENTS OR APPLICATIONS

| | | | |
|---|---|---|---|
| 633,182 | 3/1929 | France | 174/135 |
| 885,675 | 12/1961 | United Kingdom | 301/63 PW |

*Primary Examiner*—Laramie E. Askin
*Attorney, Agent, or Firm*—Harris, Kern, Wallen & Tinsley

[57] ABSTRACT

A turn-back protector securable within the return bend of a multi-conductor sheathed cable to limit the minimum radius of a return bend in the cable thereby protecting the cable from too severe bending. The protector is particularly useful in connection with butt cable splices and cable dead ends, whether under ground or above ground.

2 Claims, 4 Drawing Figures

CABLE WITH TURN BACK PROTECTOR

This application is a continuation of application Ser. No. 411,648, filed Nov. 1, 1973, and now abandoned.

This invention relates to multi-conductor cables and more particularly, to a novel turn-back protector and method of using the same to safeguard multi-conductor sheathed cables when required to be formed with a return bend.

Multi-conductor cables are frequently subjected to the risk of serious damage, particularly adjacent butt splices between a main cable and branchout service cables, or when completing certain types of dead ends in a main cable. In these circumstances, it is common practice to form a return bend of approximately 180° in one leg of the cable entering the butt splice or at a dead end cable termination. Such return bends permit a neat and compact arrangement of the cable in a minimum of space. However, it is of crucial importance that the return bend, essential to the compact arrangement, have a radius not less than a predetermined value to avoid rupture of the cable sheath, damage to the conductors, or both.

To avoid these risks and to safeguard against them, there is provided by this invention, an inexpensive rugged turn-back protector conveniently made in the form of a deeply grooved disc or wheel sized to snugly receive the cable. A convenient mode of application is to secure the protector to the cable adjacent one end of the return bend to be formed therein. This having been done at a point backwardly of the terminal end of the cable, the cable is wrapped around the protector using the latter as a forming tool for the return bend. The protector is then secured at one or more additional points to the protector and the cable is then ready to be buried or to be secured in place above ground, with assurance that the return bend will not be reduced in diameter accidentally or otherwise.

Accordingly, it is a primary object of the present invention to provide a novel article of manufacture for use as a turn-back protector for the return bend of multi-conductor sheathed cabling and a method of installing and utilizing the same to form a return bend.

Another object of the invention is the provision of a cable return bend protector comprising a peripherally grooved arcuate member having a radius not less than the minimum radius desired in the return bend of a cable.

Another object of the invention is the provision of a cable turn-back protector molded from strong lightweight material and formed in two identical parts readily securable together to form the turnback protector.

Another object of the invention is an improved mode of completing a butt end splice to a multiconductor sheathed cable to safeguard the return bend in one of the spliced cables against damage or injury by being formed or collapsed below a desired minimum radius.

These and other more specific objects will appear upon reading the following specification and claims and upon considering in connection therewith the attached drawing to which they relate.

Referring now to the drawing in which a preferred embodiment of the invention is illustrated:

Figure 1:
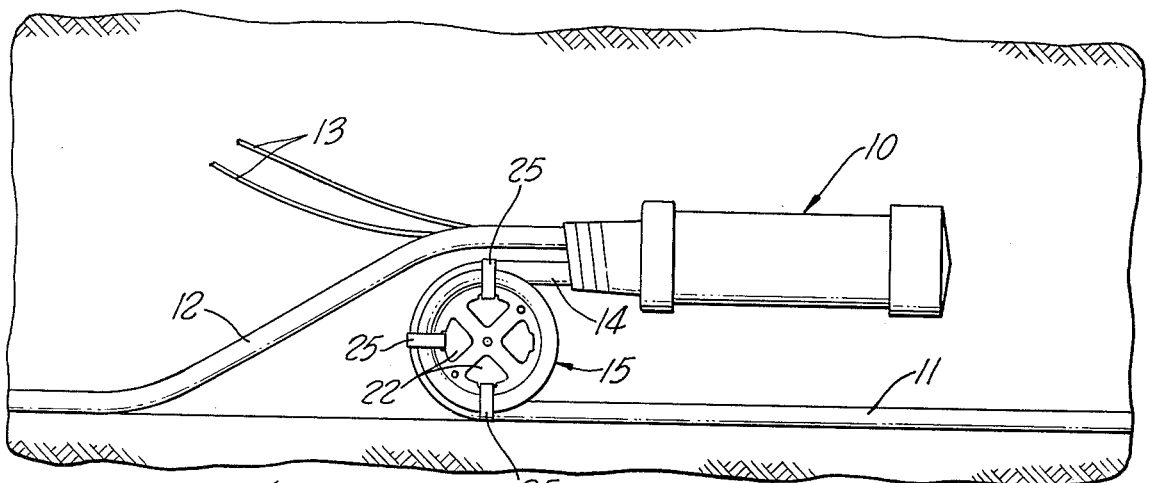
FIG. 1 is a fragmentary side view of a butt splice connection between a main cable and a branchout service cable showing the turn-back protector of the invention installed in one leg of the main cable.

Referring initially more particularly to FIG. 1, there is shown a typical underground butt type splice assembly 10, between the legs 11 and 12 of a multi-conductor sheathed main cable and a pair of branchout service cables 13. Such splice assemblies are widely used by public utilities and particularly by telephone companies in both underground and above ground installations. The details of the butt splice assembly shown in FIG. 1 are disclosed more fully in the copending application of John T. Thompson et al. Ser. No. 282,158, filed Aug. 21, 1972, now U.S. Pat. No. 3,806,630, and reference may be had to that disclosure for further information.

In completing such butt splice assemblies, it is common practice to provide one of the legs of the main cable, as leg 11, with a return bend loop 14 in order that the length of splice assembly 10 may lie generally parallel to the length of the main cable and occupy a minimum of space. However, it is of critical importance that return bend loop 14 have a radius not less than a predetermined minimum value, else the sheath of the cable as well as the conductors enclosed thereby are subjected to severe stresses which can cause damage, such as rupture of the sheath, breaking of the conductors, diminishing the conductor cross section, or short circuiting adjacent conductors, and the like problems, well known to those having experience with the installation and maintaining service of these cables. Even though a return bend loop of a proper size is provided initially, the sharpness of the return bend can be easily reduced accidentally and unintentionally in various ways well known to those skilled in this art. As is well known, cable manufacturers routinely specify the minimum radius of a bend in each cable type and size. This information is readily available and well known in the cable industry.

Figure 3:
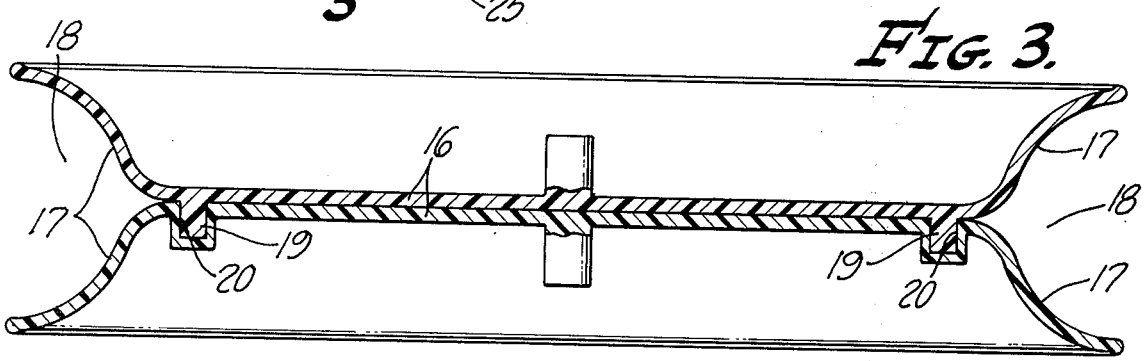
FIG. 3 is a cross-sectional view on an enlarged scale taken along line 3—3 on FIG. 2.
Figure 4:
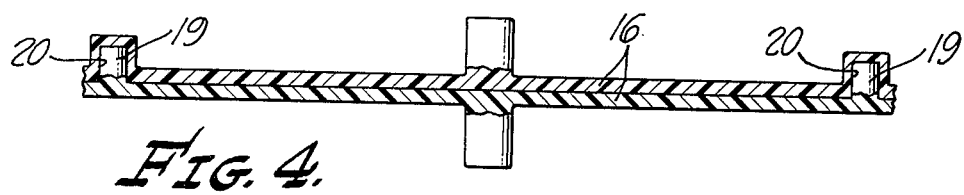
FIG. 4 is a fragmentary view on an enlarged scale taken along line 4—4 on FIG. 2.

To protect the return bend against these hazards, there is provided by this invention a turn-back protector 15 here shown by way of example as a deeply grooved disc molded from suitable material, such as lightweight, tough, high impact plastic material. It will of course be understood that a non-corrosive metal could be used. Desirably and as is best shown in FIGS. 3 and 4, protector 15 comprises a pair of identical shallow cup-shaped members 16,16 having generally flat bottoms suitably secured together as by a strong waterproof bonding agent. The sidewalls 17,17 flare outwardly away from one another to provide a deep peripheral groove 18 of semi-circular cross section sized to snugly embrace the particular size cable with which the protector is to be used. As here shown, each half 17 of the protector is provided with a pair of diametrically opposed bosses 19 and a pair of diametrically opposed shallow wells 20,20 sized to snugly receive bosses 19. Bosses 19,19 are spaced 90° from wells 20. In consequence, the identical cup-shaped parts 17,17 can be assembled back to back with wells 20 seating bosses 19.

The bottoms of the cup-shaped members 17 are also preferably provided with cutouts 22 having shallow notches 23 to receive any suitable high strength clamping members 25 (FIG. 1) encircling the cable to hold the protector firmly assembled in the return bend 14 thereof. It will be understood that the clamping means 25 may comprise convolutions of strong tape, a split band clamp, or the like of adequate strength to hold the protector securely in place in the return bend despite the stresses to which the parts may be subjected. Preferably clamping means 25 is formed of non-corrosive material immune to attack or deterioration by moisture, the elements and sunlight. It will likewise be understood that the bottoms 16,16 of members 17 are conveniently held assembled by strong adhesive such as epoxy applied between the mating surfaces of the parts.

Figure 2:
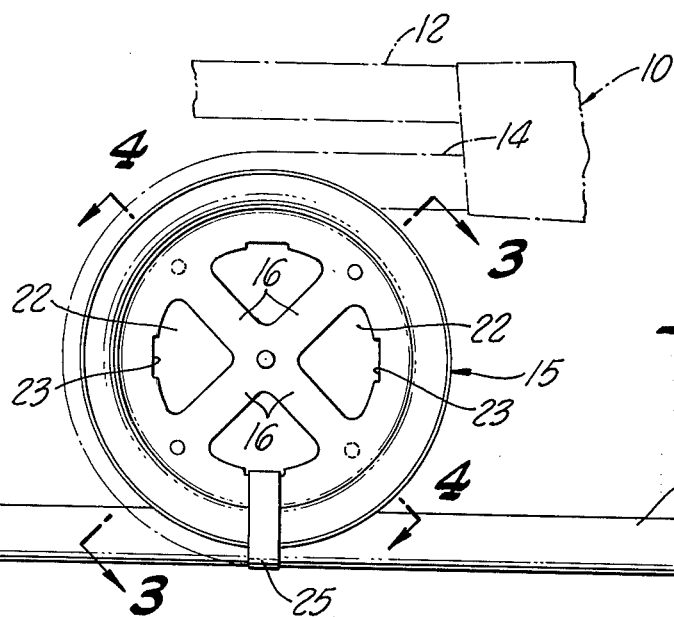
FIG. 2 is a fragmentary view showing the protector of the invention secured to one leg of the cable preparatory to wrapping that leg about the periphery of the protector to form a return bend therein.

A convenient mode of assembling the protector to the cabling and of forming the return bend in leg 11 expeditiously comprises securing protector 15 against the leg 11 of the main cable using a single one of the clamping means 25 in the manner shown in FIG. 2. Thereafter, the left hand end of cable 11 is wrapped progressively about the left hand portion of groove 18 until the return bend has been completely formed. The return bend will then be seated firmly and accurately in groove 18 and is secured against displacement by the application of one or two additional clamping bands 25. The completed assembly may then be buried or supported above ground in customary fashion without risk of the return bend being deformed or damaged.

In view of the foregoing it will be readily apparent that protector 15 may be similarly used to reinforce, stabilize and protect a return bend of a cable whether or not associated with a splice assembly. One of several such common usages is in the termination of a cable dead end and the anchorage of that dead end to a suitable support.

While the particular cable turn-back protector and method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A device installed within a return bend of a cable to rigidly support the return bend and prevent bending of the cable through an arc having less than a predetermined minimum radius, said device comprising:
   a. a circular disc of rigid material provided with an external circumferential groove having a width not less than the diameter of said cable and an inner radius not less than the inner radius of said return bend in said cable;
   b. said circular disc being installed in said return bend in said cable with said return bend in said cable disposed in said external circumferential groove in said circular disc;
   c. said circular disc being provided with circumferentially spaced openings inwardly of the periphery thereof; and
   d. at least two tie means inserted through said openings in said circular disc at points spaced apart circumferentially of said circular disc and wrapped around the periphery of said circular disc and said return bend in said cable, whereby to immovably secure said circular disc in said return bend of said cable.

2. A device as defined in claim 1 wherein said disc is formed in two identical halves having abutting central portions in which said circumferentially spaced openings are formed and having spaced, radially outwardly diverging peripheral portions forming said external circumferential groove, said central portions of said disc halves respectively having circumferentially spaced pins and respectively having circumferentially spaced recesses complementary to and snugly receiving said pins to secure said disc halves together.

* * * * *